United States Patent
Bean (10) Patent No.: US 7,387,480 B1
(45) Date of Patent: Jun. 17, 2008

(54) PRO ANGLER EQUIPMENT TRAILER

(76) Inventor: Gary Bean, 89 E. Larry Cir., Ringgold, GA (US) 30736

( * ) Notice: Subject to any disclaimer, the term of this patent is extended or adjusted under 35 U.S.C. 154(b) by 172 days.

(21) Appl. No.: 11/252,309

(22) Filed: Oct. 17, 2005

(51) Int. Cl.
*B60P 3/08* (2006.01)

(52) U.S. Cl. ..................................... 410/26
(58) Field of Classification Search ............... 410/26; 296/156, 157, 158, 24.3, 24.32
See application file for complete search history.

(56) References Cited

U.S. PATENT DOCUMENTS

| | | | |
|---|---|---|---|
| 3,902,613 A * | 9/1975 | Newland | 414/538 |
| 4,397,496 A | 8/1983 | Drygas, III | |
| 4,406,477 A | 9/1983 | McDonald | |
| 4,469,346 A * | 9/1984 | Low | 280/414.1 |
| 4,589,814 A | 5/1986 | Cates | |
| 4,693,650 A * | 9/1987 | Smith | 410/18 |
| 4,789,281 A * | 12/1988 | Westerdale | 410/29.1 |
| 4,792,268 A * | 12/1988 | Smith | 410/9 |
| 4,932,830 A | 6/1990 | Woodburn | |
| 4,992,013 A * | 2/1991 | Westerdale | 410/29.1 |
| 5,536,132 A | 7/1996 | Knott | |
| 5,730,578 A | 3/1998 | Smidler | |
| 5,772,388 A * | 6/1998 | Clark | 414/484 |
| 5,899,656 A * | 5/1999 | Rahe et al. | 414/537 |
| 7,147,268 B2 * | 12/2006 | Winter | 296/156 |
| 2003/0102685 A1 * | 6/2003 | Sioutis | 296/24.1 |
| 2004/0262949 A1 * | 12/2004 | Rasmussen | 296/158 |
| 2005/0001449 A1 * | 1/2005 | Rasmussen | 296/156 |
| 2006/0153656 A1 * | 7/2006 | Clive-Smith | 410/24 |

FOREIGN PATENT DOCUMENTS

| | | |
|---|---|---|
| GB | 911.690 | 11/1962 |
| GB | 2.053.152 | 2/1981 |

* cited by examiner

*Primary Examiner*—H Gutman
(74) *Attorney, Agent, or Firm*—Michael I Kroll (57) ABSTRACT

Apparatus 10 discloses a multipurpose trailer 12 having a lift system 24 with a plurality of organizer and fasteners uniquely designed for Pro Angler equipment and maintenance. The trailer 12 comprises a frame having a vehicle storage compartment 14 located above a boat storage compartment 16 and a work shop compartment 18 located in the forward area. The trailer 12 is towed by a motor coach 20, making the system self supporting for anglers on road tournaments.

16 Claims, 8 Drawing Sheets

PRO ANGLER EQUIPMENT TRAILER

BACKGROUND OF THE INVENTION

1. Field of the Invention

The present invention relates generally to motor coaches and, more specifically, to a multipurpose trailer having a lift system with a plurality of organizer and fasteners uniquely designed for Pro Angler equipment and maintenance. The trailer comprises a frame having a vehicle storage compartment located above a boat storage compartment and a work shop compartment located in the forward area. The trailer is towed by a motor coach, making the system self supporting for anglers on road tournaments.

2. Description of the Prior Art

There are other trailers designed for hauling. Typical of these is U.S. Pat. No. 4,397,496 issued to Drygas, III on Aug. 9, 1983.

Another patent was issued to McDonald on Sep. 27, 1983 as U.S. Pat. No. 4,406,477. Yet another U.S. Pat. No. 4,589,814 was issued to Cates on May 20, 1986 and still yet another was issued on Jan. 12, 1990 to Woodburn as U.S. Pat. No. 4,932,830.

Another patent was issued to Knott on Jul. 16, 1996 as U.S. Pat. No. 5,536,132. Yet another U.S. Pat. No. 5,730,578 was issued to Smidler on Mar. 24, 1998. Another was issued to Rahe et al. on May 4, 1999 as U.S. Pat. No. 5,899,656. Another was issued to Rahe et al. on May 4, 1999 as U.K. Patent No. 5,899,656 and still yet another was issued on Feb. 4, 1981 to Velasco as U.K. Patent No. GB2053152.

U.S. Pat. No. 4,397,496

Inventor: Thomas C. J. Drygas, III

Issued: Aug. 9, 1983

A leading self-propelled vehicle with accommodations for passengers is drivable, under the control of an operator, over roadways and has a rearwardly directed portion designed to provide for selective hitching to a trailer adapted to receive and transport self-propelled vehicles accompanying the passengers. A flexible connection can be provided between the leading vehicle and the trailer to provide, in conjunction with a protective cover on the trailer, for streamline flow of air around the trailer.

U.S. Pat. No. 4,406,477

Inventor: Lowell R. McDonald

Issued: Sep. 27, 1983

A double load trailer adapted for receiving an automobile on a first horizontal frame mounted on a wheeled axle. A second horizontal frame is slidably mounted on a plurality of vertical posts attached to the first frame. The second frame is adapted for receiving a boat thereon. When the automobile has been unloaded from the trailer, the second frame is lowered in a horizontal plane on top of the first frame so the boat can be unloaded from the trailer into the water.

U.S. Pat. No. 4,589,814

Inventor: Medwin A. Cates

Issued: May 20, 1986

This application covers a trailer which has platforms at two levels, one for a boat and one for an automobile. It includes a frame supported by wheels, a primary loading platform which rests on the main frame and is pivotally attached thereto so that it can be tilted therewith. An upper or secondary load carrying platform is supported above the primary load platform by four stanchion. Means are provided to pull the secondary load platform down to the first load platform and then pivot the two so that a boat can be pulled onto the upper or secondary load platform. Then, the upper load platform is pivoted about the stanchion to an upright position and locked in place. The secondary or primary loading platforms are then pivoted together and the lower platform can then be loaded, for example, by driving a car up on it. When it is loaded, then the fixed primary and secondary loading platforms are rotated about the pivot so that they rest securely on the main frame. Means are provided to secure the platforms to the frame.

U.S. Pat. No. 4,932,830

Inventor: Clarence A. Woodburn

Issued: Jun. 12, 1990

An automobile/boat trailer for transporting an automobile with a boat supported above the automobile. Four corner vertical support columns are mounted on a trailer having standard rails for supporting an automobile. A boat trailer cradle is mounted so as to be vertically slidable along the support columns. Cables are attached to the trailer cradle and pass over pulleys secured to the top of each column. The cables are secured at their other ends to a winch for raising and lowering the boat cradle. Safety locks are provided for preventing the lowering of the boat cradle if the cables fail to support the cradle.

U.S. Pat. No. 5,536,132

Inventor: James M. Knott

Issued: Jul. 16, 1996

The present invention relates to an apparatus and method for converting a semi-trailer or intermodal shipping container from carrying general freight cargo to carrying automobiles. More specifically, the present invention provides for a lift mechanism which is powered by the drive wheels of the automobile being carried by the lift so that a plurality of automobiles may be carried in two levels in an enclosed semi-trailer or intermodal shipping container. The method of the present invention is also adaptable to being employed in piggy back transportation of semi-trailers or intermodal shipping containers on railroad cars. The apparatus of the present invention is designed for flexibility in use and ease of assembly and disassembly which comprises lift assemblies based on the use of ball screws powered from flexible cable drives.

U.S. Pat. No. 5,730,578

Inventor: Francis S. Smidler

Issued: Mar. 24, 1998

A trailer for hauling cargo, such as general freight, automobiles, small trucks and the like, has a deck element therein. The deck element is capable of being raised or lowered by a lifting assembly to a variety of positions within the trailer and can be secured to side walls of the trailer by cammed bracket members. A guide assembly is provided to prevent forward and rearward movement of the deck element during transportation of the trailer. The trailer can be tilted backwards until a back end of the trailer contacts the ground so that cargo can be easily loaded into the trailer. Cargo can be loaded onto the deck element and underneath the deck element on the floor of the trailer. The lifting assembly is substantially horizontally arranged along the top of the trailer so that when automobiles are loaded onto the deck element and the deck element is raised, the lifting assembly does not interfere with the space occupied by the automobiles.

U.S. Pat. No. 5,899,656

Inventor: Jack Rahe et al.

Issued: May 4, 1999

This invention relates to a multi-purpose boat, boat trailer and motor vehicle trailer. This trailer comprises a frame, a boat trailer wheel support assembly attached to the frame for supporting the boat trailer above the motor vehicle. A pair of boat trailer ramps are provided hingeably connected to the frame and removably attached to the boat trailer wheel support assembly. A pair of wheel support channels on the frame support and guide the wheels of the motor vehicle on the multi-purpose trailer. Additionally, a pair of loading ramps are removably connected to the motor vehicle wheel support channels for loading and unloading the motor vehicle or, alternatively, the channels may be connected to the boat trailer ramps for loading/unloading the boat trailer.

U.K. Patent Number GB911,890

Inventor: William Alfred Leaver

Issued: Nov. 28, 1962

Motor cars are loaded on to a railway truck both in a well 3, FIG. 1, formed between end frames 1 of the truck by the lower floors of hoists 4 and also on an upper floor or deck formed by the upper floors of the hoists which have their tops flush with platforms 5 carried by the frames when the hoists are in their lowermost positions. The hoists are lifted by side, pillars 6 carrying pulleys 7 over which lifting ropes 8 pass to manually operated winches 9. The top of the hoists are given some initial vertical lost motion relative to the lower floor by vertical rods 15, FIG. 4, at the corners of each hoist, which pass through brackets 16 fixed to the lower floor. The ends of the rods have flanges 17 which rest on side members of the truck when the hoists are lowered. The rods move upwardly with lost motion until the flanges engage the brackets to enable cross girders 14 which strengthen the top floor to be used without heightening the truck.

U.K. Patent Number GB2053152

Inventor: Julio Maliada Velasco

Issued: Feb. 4, 1981

A garage lift comprises a base structure 11 provided with runner boards or skids (13, FIG. 2, not shown), two identical pairs of supporting arms 4 which are pivotally attached to the base and swingable in unison by respective hydraulic cylinders mechanically linked thereto and to the base, and a load-carrying support 2 pivotally connected to the free ends of the pairs of arms whereby it remains horizontal throughout its travel, a pair of stays 3 being pivoted to one pair of arms and engageable with racks 9 on the base to retain the support 2 at a predetermined height.

While these motor coaches may be suitable for the purposes for which they were designed, they would not be as suitable for the purposes of the present invention, as hereinafter described.

SUMMARY OF THE PRESENT INVENTION

The present invention discloses a multipurpose trailer having a lift system with a plurality of organizer and fasteners uniquely designed for Pro Angler equipment and maintenance. The trailer comprises a frame having a vehicle storage compartment located above a boat storage compartment and a work shop compartment located in the forward area. The trailer is towed by a motor coach, making the system self supporting for anglers on road tournaments.

A primary object of the present invention is to provide a vehicle for transporting Pro Angler equipment to a location.

Another object of the present invention is to provide a housing for said vehicle forming a trailer.

Yet another object of the present invention is to provide said sport-fishing trailer with means for storing a boat, tow vehicle and tackle shop.

Still yet another object of the present invention is to provide said trailer with means for storing said tow vehicle overhead of said boat.

Another object of the present invention is to provide said trailer with a compartment having a plurality of equipment storage receptacles forming an integral part of said trailer.

Yet another object of the present invention is to provide a method whereby a user can transport a tow vehicle, boat and complement of sundry equipment related to sports fishing.

Additional objects of the present invention will appear as the description proceeds.

The present invention overcomes the shortcomings of the prior art by providing a multipurpose trailer having a lift system with a plurality of organizer and fasteners uniquely designed for Pro Angler equipment and maintenance. The trailer comprises a frame having a vehicle storage compartment located above a boat storage compartment and a work shop compartment located in the forward area. The trailer is towed by a motor coach, making the system self supporting for anglers on road tournaments.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.
10 present invention
12 trailer
14 towing vehicle storage compartment
16 boat and trailer storage compartment
18 work shop compartment
20 motor coach
22 living and sleeping quarters
24 lift
26 roll out canopy
28 side lights
30 tow vehicle
32 boat and trailer
34 extension ramp
36 flip out ramp
38 stop block
40 storage cabinets
42 gear storage cabinets
44 rod/reel storage
46 bait storage area
48 tackle storage area
50 work station/area
52 brace
54 entry
56 floor
58 pivot

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
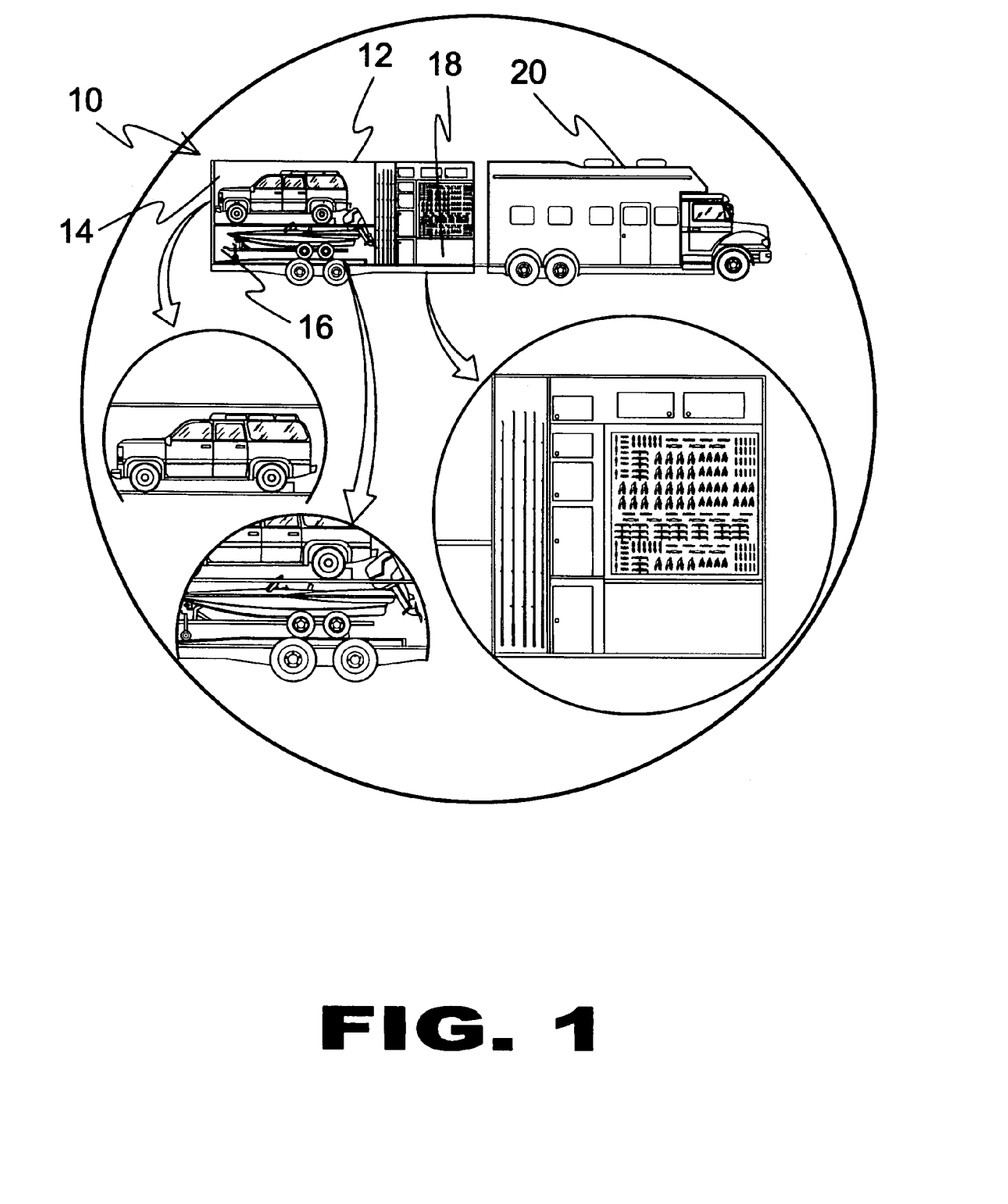
FIG. 1 is an illustrative view of the present invention.

Turning to FIG. 1, shown therein is an illustrative view of the present invention 10. The present invention 10 discloses a multipurpose trailer 12 having a lift system with a plurality of organizer and fasteners uniquely designed for Pro Angler equipment and maintenance. The trailer 12 comprises a frame having a vehicle storage compartment 14 located above a boat storage compartment 16 and a work shop compartment 18 located in the forward area. The trailer 12 is towed by a motor coach 20, making the system self supporting for anglers on road tournaments.

Figure 2:
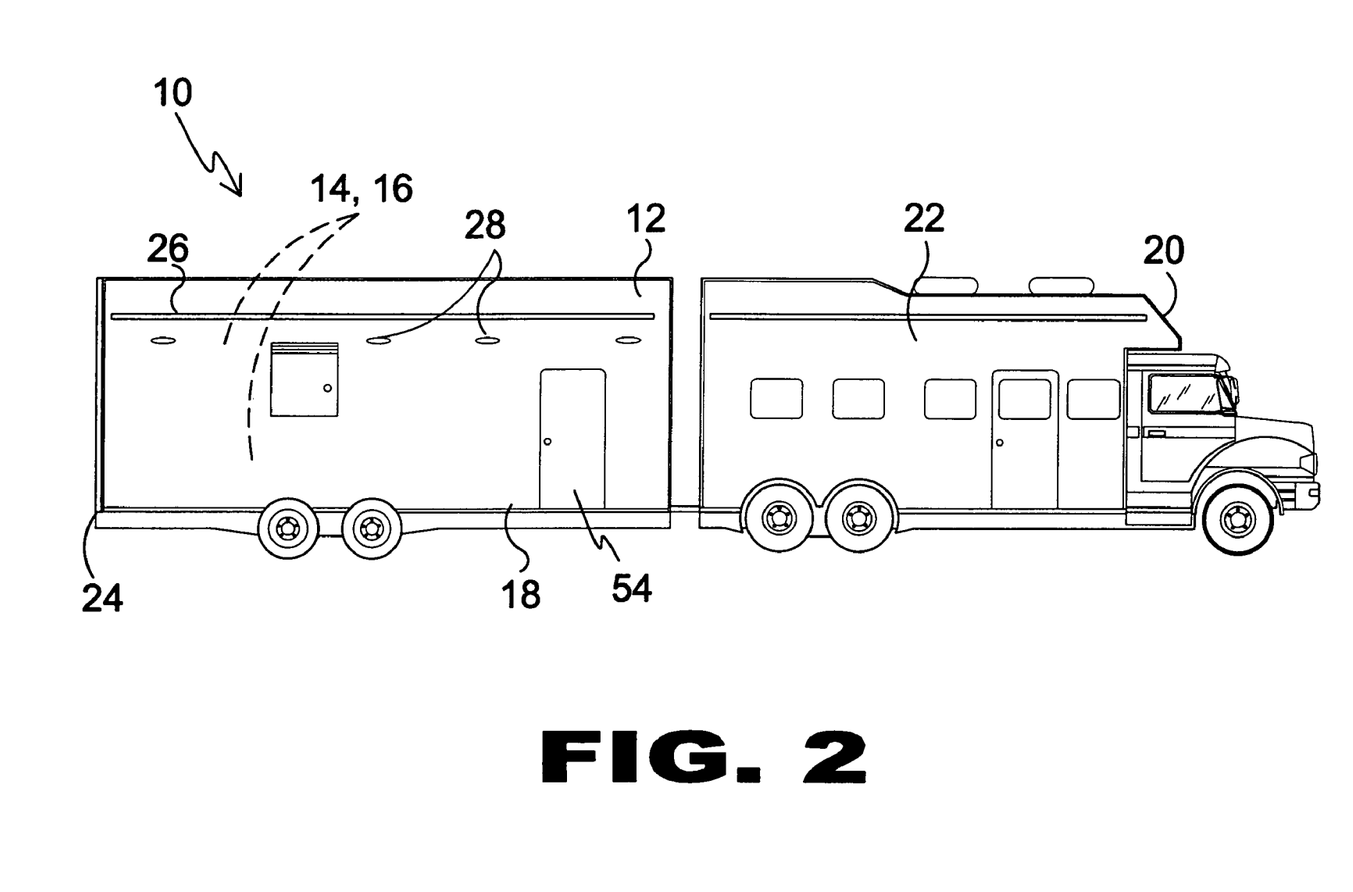
FIG. 2 is a side view of the exterior of the present invention.

Turning to FIG. 2, shown therein is a side view of the exterior of the present invention 10. Shown is a side view of the exterior of the trailer 12 of the present invention 10 disclosing a multipurpose trailer that allows the user the freedom to travel to fishing events while having living and sleeping quarters 22, work shop 18, gear storage and vehicle and boat storage all in one making life on the tournament trail better for the pro angler. Also shown are the motor coach 20, means for lifting 24, e.g., a lift, roll out canopy 26, side lights 28 and double levels 14, 16 for the vehicle and boat, respectively, and outside entry 54.

Figure 3:
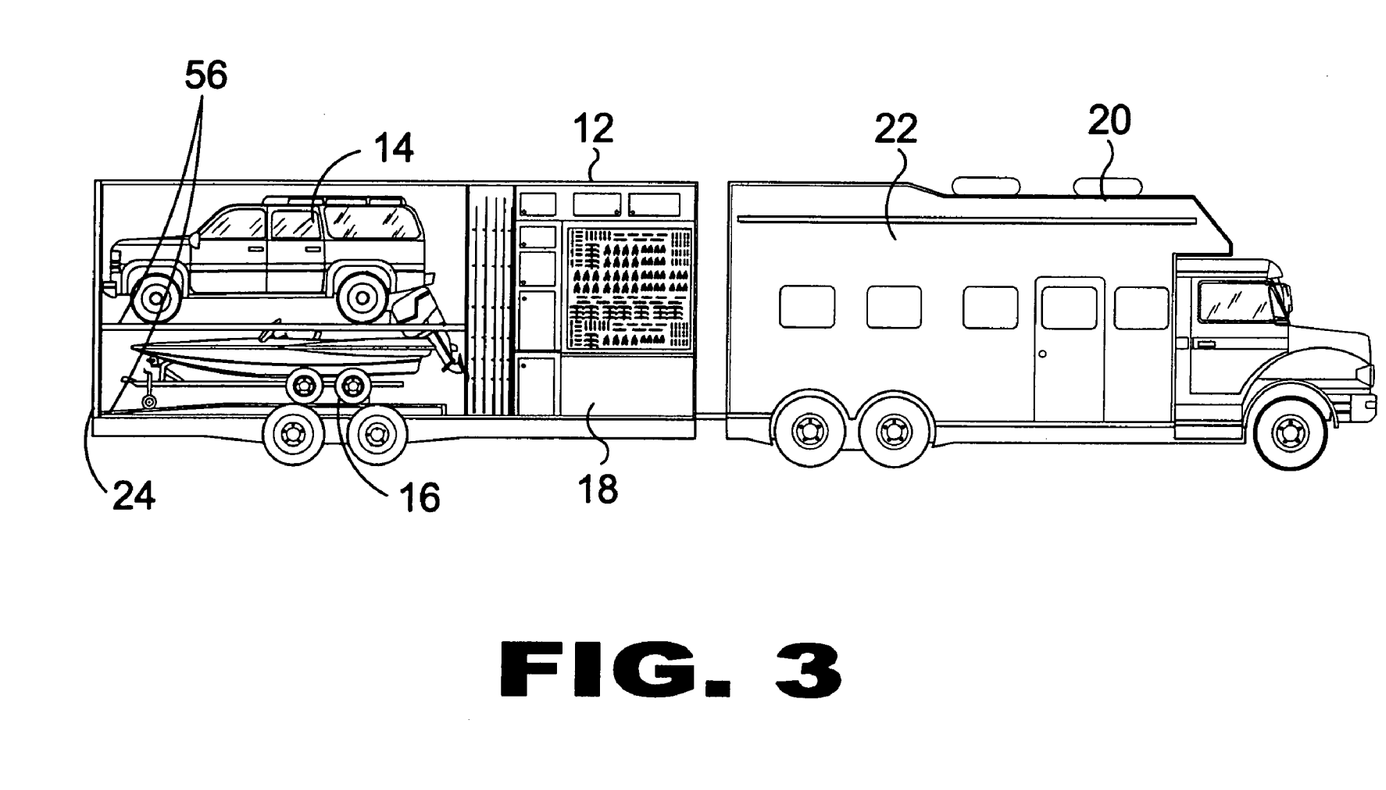
FIG. 3 is a side sectional view of the exterior of the present invention.

Turning to FIG. 3, shown therein is a side sectional view of the exterior of the present invention 10. Shown is a side sectional view of the trailer 12 of the present invention 10 disclosing the multipurpose trailer which allows the pro angler to be completely self contained as in motor coach 20, boat and trailer 16 on floor 56, tow vehicle 14 on floor 56 and tackle shop 18 while traveling and fishing. The system removes the need to rent a hotel room, has a complete tackle shop onboard and allows for stacking the tow vehicle and boat and trailer within the present invention. Also shown are living quarters 22 along with lift 24.

Figure 4:
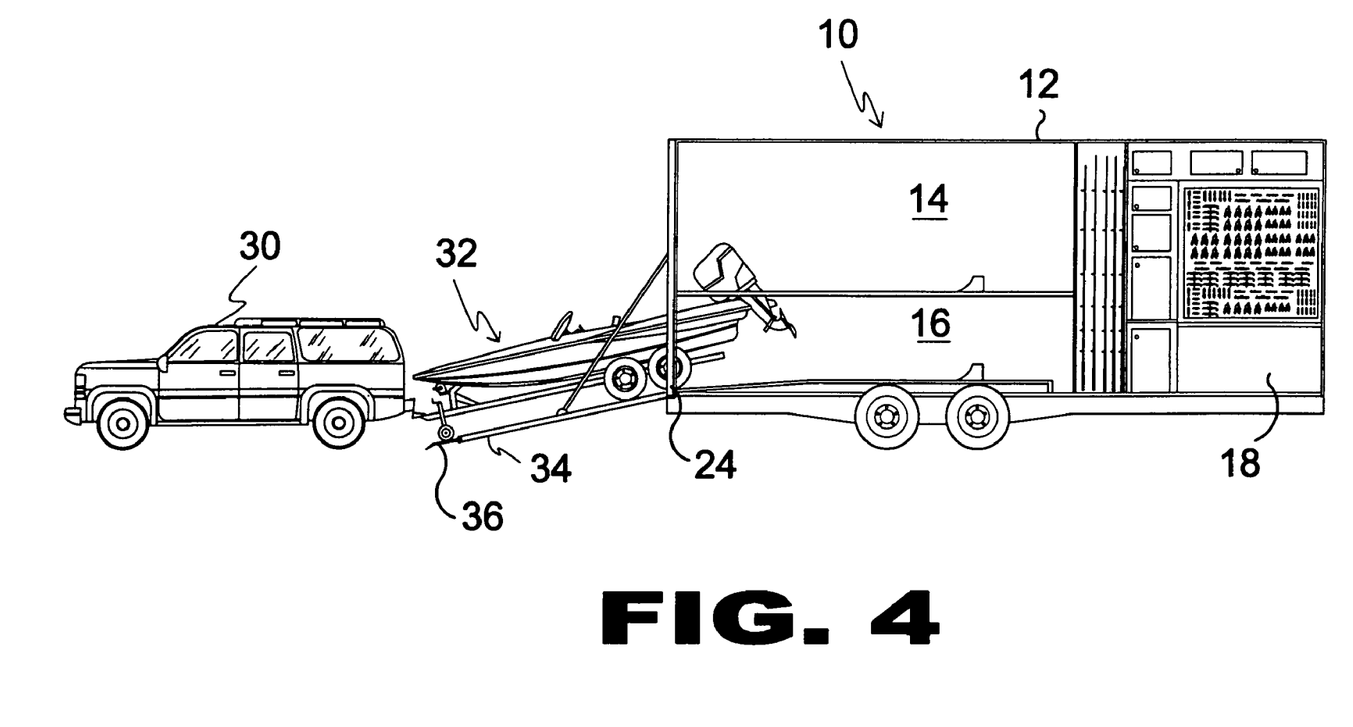
FIG. 4 is a side view of the exterior of the present invention.

Turning to FIG. 4, shown therein is a side view of the exterior of the present invention 10. Shown is a side view of the trailer 12 of the present invention 10 having a towing vehicle 30 placing a boat and trailer 32 into the lower level 16 of the trailer by means of its hydraulic lift 24 and flip out ramp 36 on extension ramp 34. Other previously disclosed elements are also shown.

Figure 5:
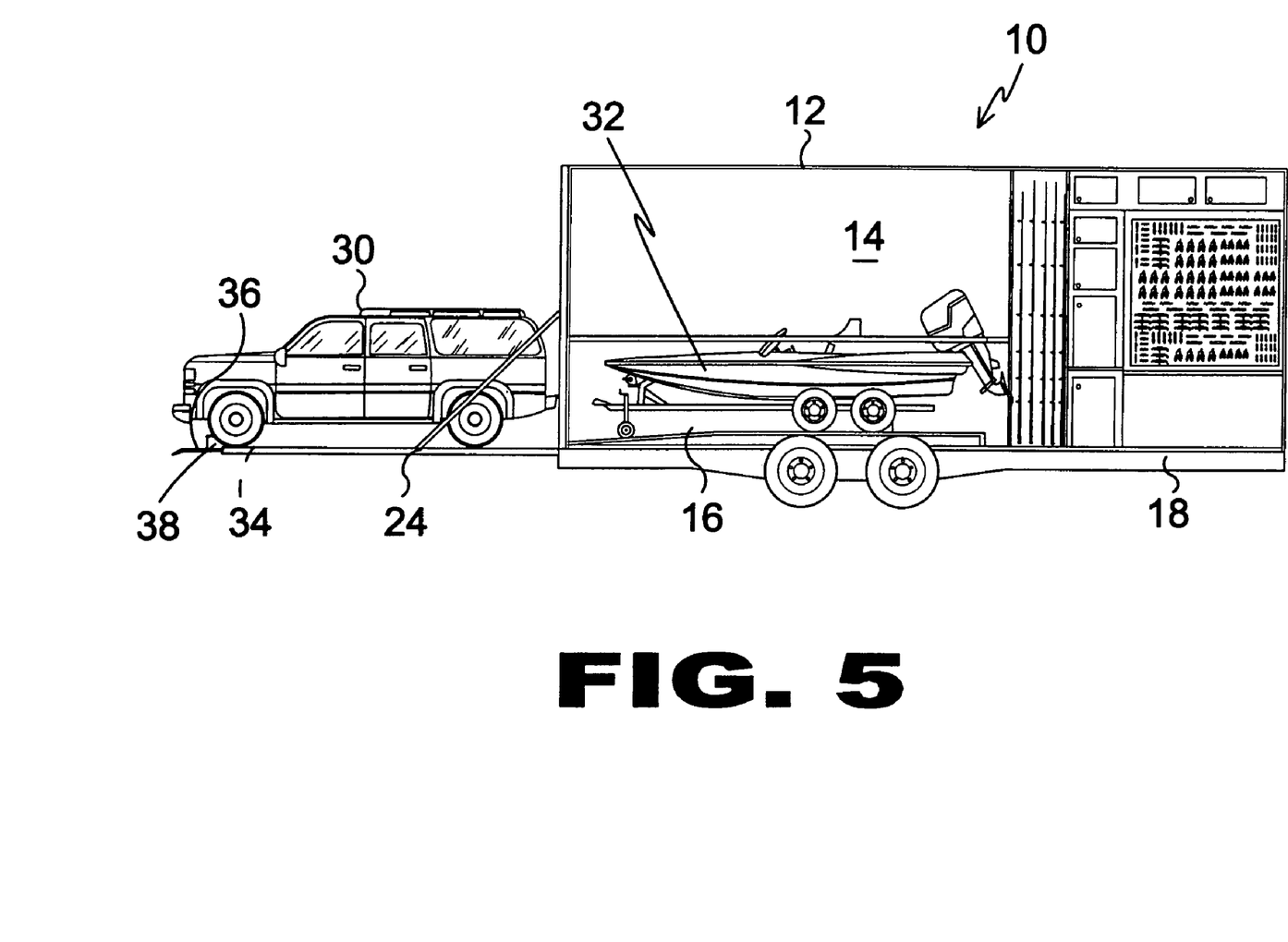
FIG. 5 is a side view of the exterior of the present invention.

Turning to FIG. 5, shown therein is a side view of the exterior of the present invention 10. Shown is a side view of the trailer 12 of the present invention 10 having the towing vehicle 30 disconnected from the boat trailer and sitting on the hydraulic lift 24 to be lifted to the upper level 14 where it will be parked and stored. Other previously disclosed elements are also shown along with stop block 38.

Figure 6:
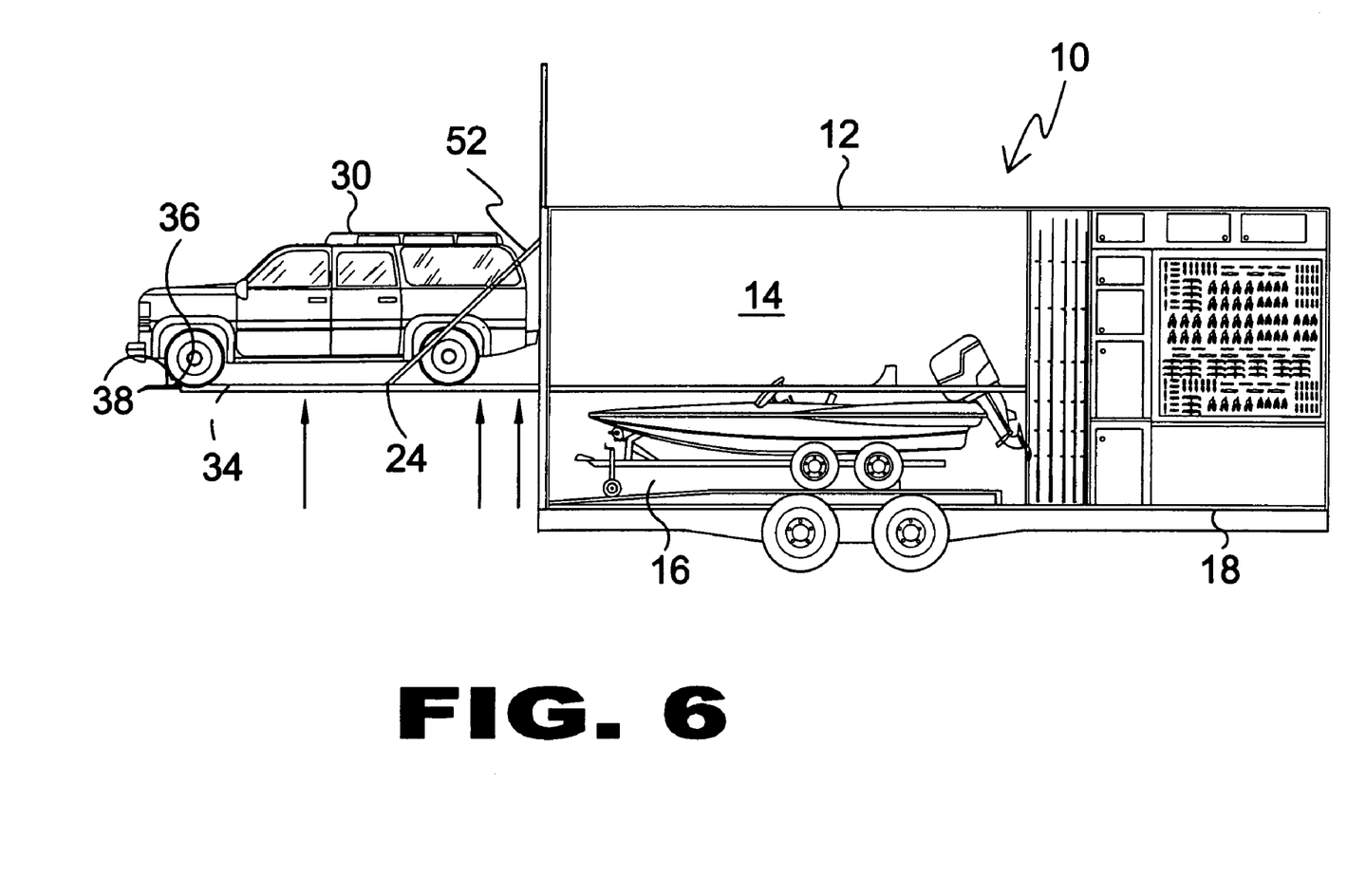
FIG. 6 is a side view of the exterior of the present invention.

Turning to FIG. 6, shown therein is a side view of the exterior of the present invention 10. Shown is a side view of the trailer 12 of the present invention 10 having the towing vehicle 30 disconnected from the boat trailer and being lifted by the hydraulic lift 24 to the upper level 14 where it will be parked and stored. Means for lifting 24 moves vertically between the upper and lower compartments 14, 16 so as to have the same elevation of the floor of the two compartments for loading the vehicle and boat/trailer into and from the trailer. Other previously disclosed elements are also shown along with a brace 52 for supporting the lift 24.

Figure 7:
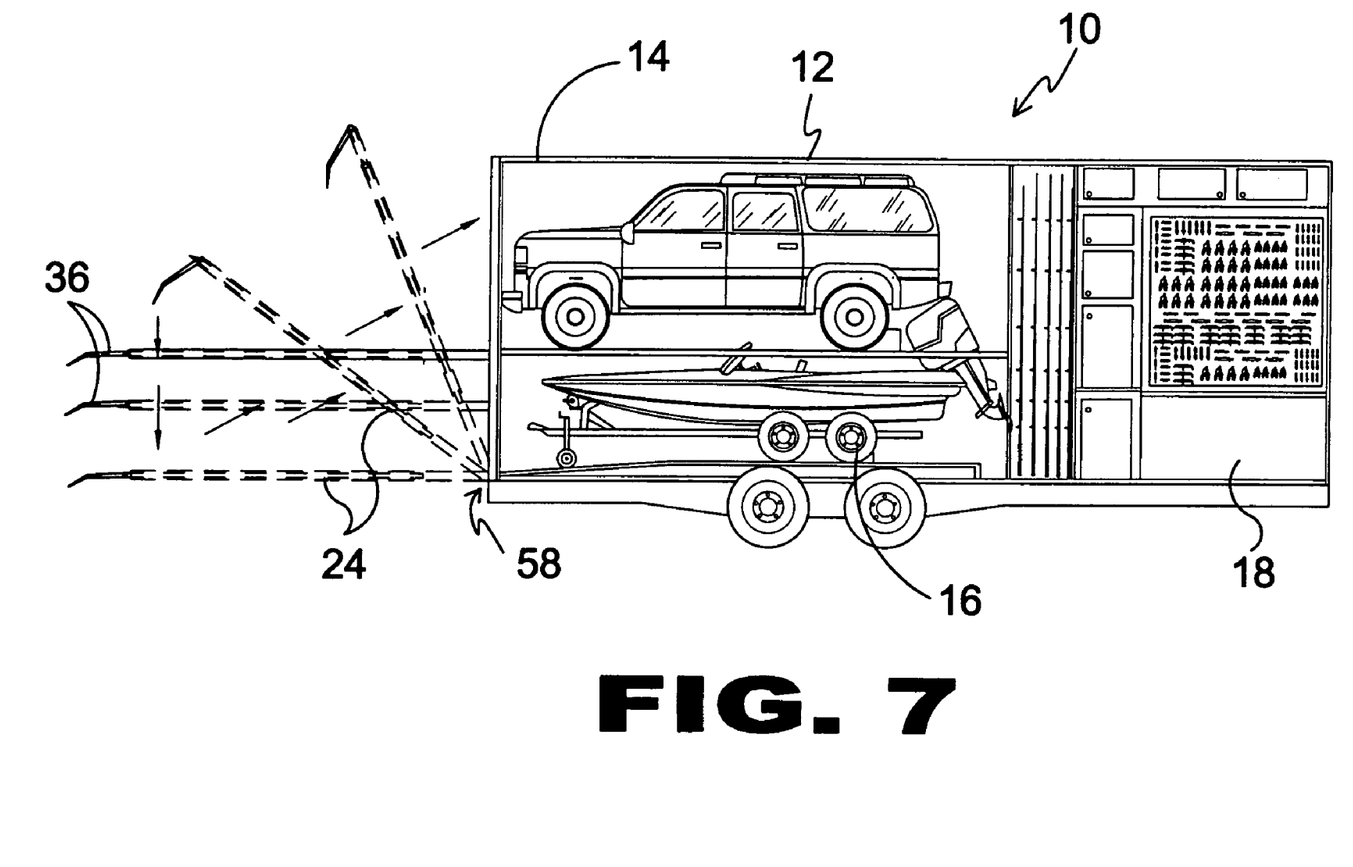
FIG. 7 is a side view of the present invention.

Turning to FIG. 7, shown therein is a side view of the present invention 10. Shown is a side view of the present invention 10 disclosing a multipurpose trailer 12 having a lift system with a plurality of organizer and fasteners uniquely designed for Pro Angler equipment and maintenance. The trailer 12 comprises a frame having a vehicle storage compartment 14 located above a boat storage compartment 16 and a work shop compartment 18 located in the forward area. The trailer 12 is towed by a motor coach, making the system self supporting for anglers on road tournaments. Other previously disclosed elements are also shown along with an end of the lift 24 being pivotally connected at 58 to the lower, rear of the trailer 12 so as to pivot from a vertical position to a horizontal position for loading/unloading the vehicle and boat/trailer.

Figure 8:
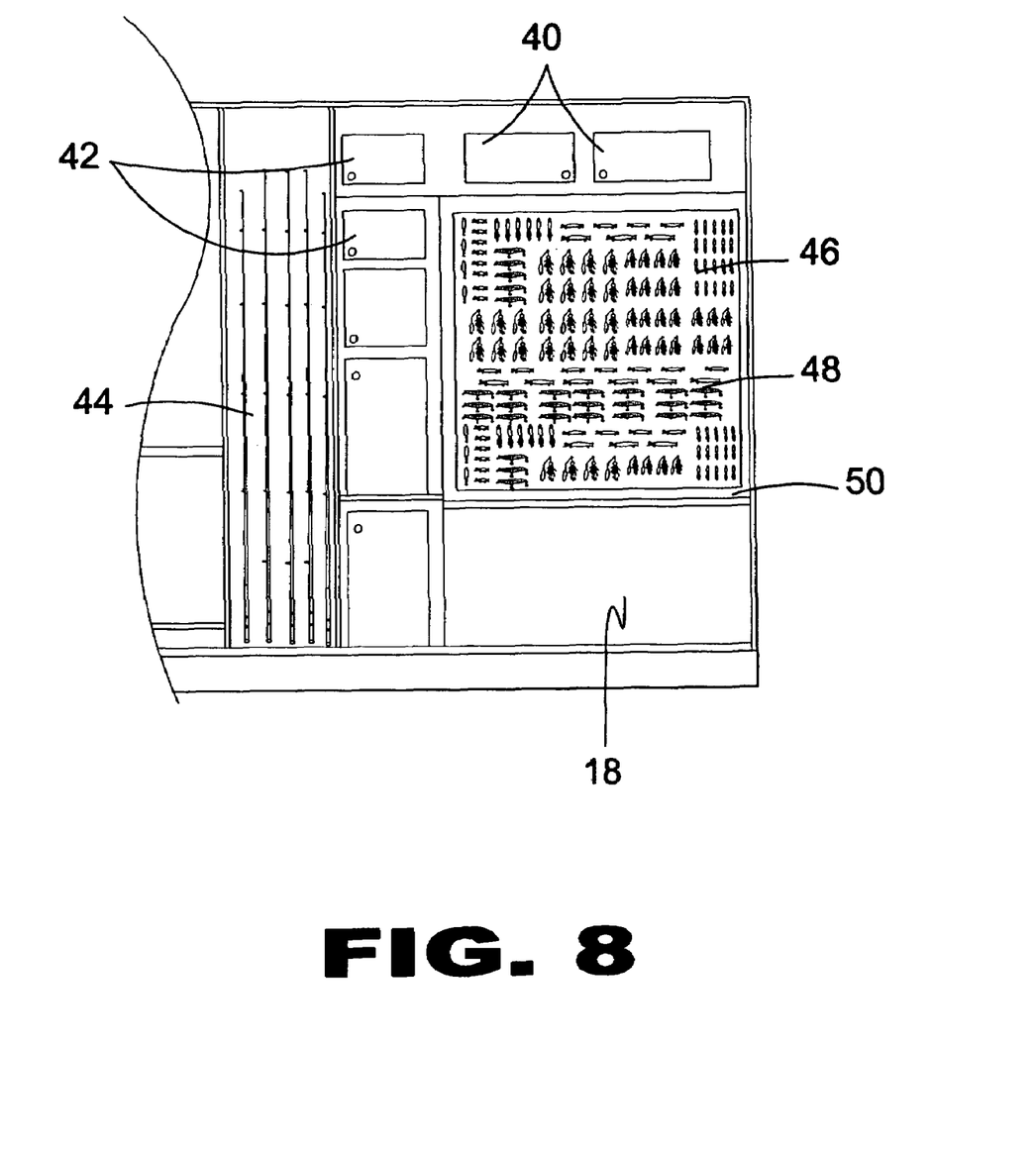
FIG. 8 is a detailed view of the work shop area of the present invention.

Turning to FIG. 8, shown therein is a detailed view of the work shop area 18 of the present invention. The work shop area 18 of the present invention comprises a plurality of organizer and fasteners uniquely designed for Pro Angler equipment and maintenance and is located in the forward area of the trailer. Shown are storage cabinets 40, gear storage cabinets 42, an area for rods/reels 44, bait storage area 46, tackle storage area 48 and a work station/area 50.

I claim:

1. An apparatus for an equipment trailer, the equipment trailer for being towed behind a motor coach, the motor coach providing living and sleeping areas for a user, the apparatus comprising:
    a) an equipment trailer, said equipment trailer being enclosed, said equipment trailer having front and rear ends, upper and lower sides, and first and second lateral sides, wherein said front end of said equipment trailer is connected to the rear of the motor coach;
    b) a first compartment being disposed in said front end of said equipment trailer for containing a work shop;
    c) a second compartment being disposed in said rear end of said equipment trailer for storing a boat on a boat trailer therein, a floor being disposed in said second compartment;
    d) a third compartment being disposed in said rear end of said equipment trailer for storing a vehicle therein for towing the boat trailer so that said third compartment is above said second compartment, a floor being disposed in said third compartment;
    e) means for lifting being disposed on said rear end of said equipment trailer, whereby the boat and the boat trailer can be loaded into and removed from the second compartment and the vehicle can be loaded into and removed from the third compartment; and
    f) wherein said means for lifting comprises:
        i) a lift being disposed on said rear end of said equipment trailer, said lift having first and second opposing ends, wherein said second end of said lift is oriented toward said rear end of said equipment trailer; and,
        ii) wherein said second end of said lift is pivotally connected to said rear end of said equipment trailer so that said lift can be pivoted from a first position being substantially vertical to a second position being substantially horizontal.

2. The apparatus of claim 1, wherein said lift can be raised or lowered vertically when said lift is in said second position so that the boat and the boat trailer can be loaded into and removed from the second compartment and the towing vehicle can be loaded into and removed from the third compartment.

3. The apparatus of claim 2, wherein said lift can be moved to an elevation substantially equal to the floor of said third compartment so that the vehicle can be loaded into and removed from the third compartment.

4. The apparatus of claim 3, wherein said lift can be moved to an elevation substantially equal to the floor of said second compartment so that the boat and the boat trailer can be loaded into and removed from the third compartment.

5. The apparatus of claim 4, further comprising an extension ramp being disposed on said first end of said lift to permit the length of the lift to be varied.

6. The apparatus of claim 5, further comprising a flip-out ramp being disposed on said first end of said lift to permit the length of the lift to be varied.

7. The apparatus of claim 6, further comprising a stop block being disposed on said first end of said lift to permit a vehicle to be secured on the lift.

8. The apparatus of claim 7, further comprising a brace for supporting said lift so that said brace connects said lift to said trailer.

9. The apparatus of claim 8, wherein said lift is a hydraulic lift.

10. The apparatus of claim 9, further comprising a roll out canopy being disposed on said sides of said trailer.

11. The apparatus of claim 10, further comprising an entry into said first compartment so that a user can enter the first compartment from the outside.

12. The apparatus of claim 11, further comprising a plurality of storage cabinets being disposed in said first compartment.

13. The apparatus of claim 12, further comprising a tackle storage area being disposed in said first compartment.

14. The apparatus of claim 13, further comprising a rod and reel storage area being disposed in said first compartment.

15. The apparatus of claim 14, further comprising a bait storage area being disposed in said first compartment.

16. The apparatus of claim 15, further comprising a work station being disposed in said first compartment.

* * * * *